Aug. 21, 1934.   P. M. HALL   1,971,217
SEAM WELDING APPARATUS
Filed Oct. 8, 1931   2 Sheets-Sheet 1

Inventor
Preston M. Hall

Aug. 21, 1934.   P. M. HALL   1,971,217
SEAM WELDING APPARATUS
Filed Oct. 8, 1931   2 Sheets-Sheet 2

Inventor
Preston M. Hall
by Wright, Brown, Quinby & Gray
Attys.

Patented Aug. 21, 1934

1,971,217

UNITED STATES PATENT OFFICE 1,971,217

SEAM WELDING APPARATUS

Preston M. Hall, Worcester, Mass., assignor to Federal Machine & Welder Company, Warren, Ohio Application October 8, 1931, Serial No. 567,594

13 Claims. (Cl. 219—4)

This invention relates to the art which in commercial practice is called electric seam welding. Welds of this character are made between overlapping pieces or sheets of metal, or the overlapping opposite edges of a single piece ent into hollow formation, and such welds are continuous in that all points along a given line of the overlapping pieces or edges are joined together. That is, a seam welded joint is distinguished by the continuity of its seam from spot welded joints, wherein the union is made by welds at a series of separate and discontinuous points.

Seam welding has long been known in principle and has been practised commercially by the use of a wheel electrode which is caused to roll along the seam line on overlapping pieces resting upon a table or platen electrode; said electrodes being connected electrically in the low tension secondary circuit of a transformer of electricity. But the length of the seams which can be made by the methods and machines heretofore used and the thickness of the metal pieces which can be thus welded is narrowly limited, and the speed of welding progress along the seam is low. These limitations are imposed by the fact that a drop in the voltage and current occurs in proportion to the distance of the welding point from the transformer, and that an appreciable time is required for the current to heat the metal pieces up to the welding temperature. In the case of a long seam the voltage gradient is so great that if the current is sufficient to develop welding heat at the end remote from the transformer, it may be sufficient to overheat and burn the metal at the end nearest the transformer; while if only powerful enough for a good weld at the nearer end, it may be insufficient to produce a weld at all at and near the remote end of the seam. Owing to the lag in heating effect, the traveling electrode must travel slowly enough to cause generation of welding heat at the point of contact and exert pressure to consolidate the weld after the metal has been softened by heat. Observation has shown that the point of greatest heat is behind the tangent point of the wheel electrode with the work (i. e., the point where a radius of the wheel perpendicular to the surface of the work intersects such surface). If the wheel electrode travels so fast as to exert only a small degree of pressure on the softened metal, the weld will be imperfect and the metal will be burned; while still faster travel may result in failure to heat the metal even up to the welding temperature. A slower progress of the movable electrode is necessary when thicker pieces are to be welded than with thinner pieces, and in general the rate of progress is inversely proportional to the thickness of the pieces.

I have discovered and invented ways and means for widely enlarging the limitations of length of seam, thickness of pieces capable of being lap welded electrically, and speed of welding such a seam. These include a new electrical circuit in which the welding electrodes are included and by which a wholly or substantially uniform load current is supplied at all points along the length of the seam. Thereby the welding current circuit ceases to be the factor limiting the possible length of a welded seam, and seams of any length within practical limits established by other factors may be made in a uniform manner and without danger of burning at either end by too heavy a current. I have also devised a new type of electrode applicable to seam welding which has made possible progressive welding at a speed much greater than heretofore with metal pieces of any practicable thickness, and by which metal pieces of greater thickness may be welded together than has been possible heretofore.

The invention consists in the principles and various embodiments of machines or apparatus and processes for obtaining the foregoing accomplishments. One of such embodiments is illustratively described in detail in the following specification and represented in the drawings, in which,—

Like reference characters designate the same parts wherever they occur in all the figures.

Figure 1:
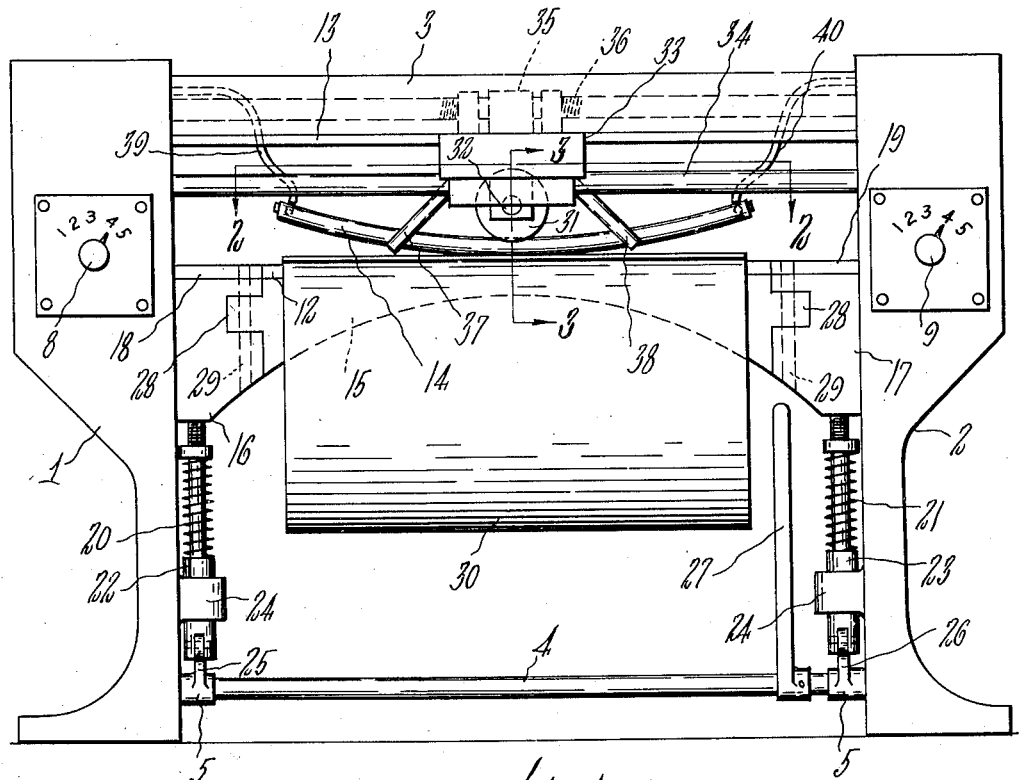
Fig. 1 is a front elevation of an electric welding machine embodying the invention and stripped of driving control means which, while necessary or desirable for mechanical operation, are not essential to be shown for the purpose of illustrating the new characteristics in which the invention consists.

The machine comprises a frame of any suitable character, here represented by two side members 1 and 2, a hollow cross beam 3, and a rock shaft 4 on which are fixed collars 5, 5 and complemental abutments concealed by the foot portions of the side members, by which such foot portions are prevented from being drawn apart or together. It may be assumed that the side members have sufficient depth from front to rear to be stably supported on a floor or other base. Electrical transformers 6 and 7 (Figs. 5 and 6) of a voltage step down type suitable for electric welding circuits, are mounted in or on the side members 1 and 2 of the frame. They are concealed from view in Fig. 1 by a structural part of the side members, but said figure shows at 8 and 9 switches by which the current input to the transformers may be varied and regulated. It may be noted in passing that the transformers herein illustrated are of a standard character consisting of a core, a primary winding 10 having a number of turns, to which current is supplied from a convenient source, and a secondary circuit 11 having a single turn and composed of massive copper conductors.

Corresponding terminals (i. e., those of the same sign) of the two transformer secondaries are connected electrically to opposite ends of a table or bed electrode 12; and the secondary circuit terminals of opposite sign are connected to the ends of a conductor 13 from which connection is made with the complemental shiftable electrode 14. The bed electrode is conveniently a massive copper bar or shell supported on a rigid bridge 15 which has detachable connection at one or both ends with abutments 16 and 17. These abutments carry conductors 18 and 19, which complete the connections between the ends of the bed electrode 12 and the transformer secondaries. The abutments 16 and 17 have sliding engagement in suitable upright guideways in the frame side members and are pressed upwardly by springs 20 and 21 which react on slide bars 22 and 23 respectively, the slide bars in turn being movable in guides 24 and controlled by cams 25 and 26 on rock shaft 4. The lever arm 27 on the rock shaft typifies means for turning the shaft so as to raise or lower the abutments and to press the parts to be welded against the electrode 14 with a yielding pressure.

The bridge 15 is coupled to the abutments by overlapping tongues 28 at its ends and pins 29 which pass through such tongues. Either or both of such pins may be removable and either may serve as a hinge pintle, while the other serves as a locking bolt. This enables the bridge and bed electrode to be disconnected from the circuit and swung aside for the purpose of applying and removing the work piece 30, when such work piece is a hollow body, the sides of which form a closed outline. Pieces or plates to be welded, if otherwise unconnected, may be placed on the bed electrode without such disconnection. The composite construction of this electrode and bridge is provided in order to obtain the structural strength and rigidity of materials such as steel or iron, etc. with the conductivity of copper in the electrode proper. But this is a detail which may be modified without departure from the invention. The important factors of this phase of the invention are that the bed electrode is coupled at its opposite ends with the two transformers and that its circuit is broken incidentally to the placement and displacement of tubular work.

Figure 2:
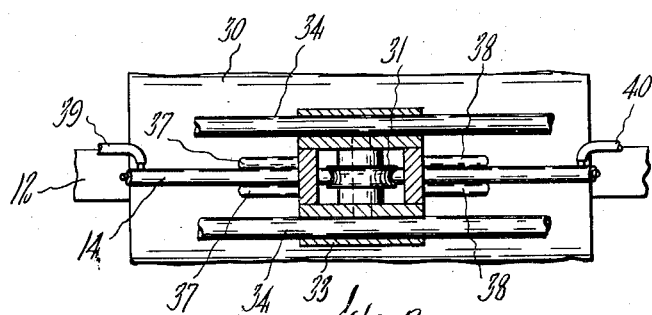
Fig. 2 is a fragmentary plan and sectional view taken on line 2—2 of Fig. 1.
Figure 3:
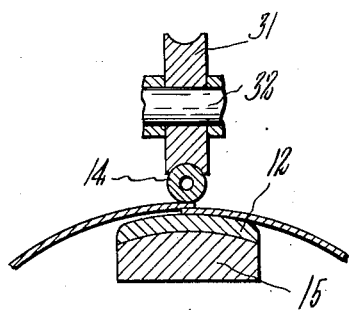
Fig. 3 is a detail vertical section taken on line 3—3 of Fig. 1.

The complemental shiftable electrode 14 is in the illustration of Figs. 1, 2 and 3, a curved bar of good conducting material, as copper, as long as the seam to be welded, or longer, and curved with a continuous curvature which is preferably the arc of a circle. It is engaged and pressed against the work by a wheel 31 connected by a pivot 32 to a carriage 33. The carriage in turn slides upon a rigid guide rod 34 and is provided with a threaded lug or nut portion 35 which is engaged with a lead screw 36. This lead screw may be driven by any suitable means or mechanism, such as an electric motor, a belt from a counter shaft, or even a hand crank. No specific means for rotating it are shown, because it is assumed that any skilled mechanic will understand without illustration how power may be applied to the screw. It is sufficient for the purposes of this explanation to be understood that positive propelling means are provided for moving the carriage 33 along a guide of suitable character, whether such guide is the bar 34 or the beam 3, or other suitable structure; and that in such movement of the carriage the wheel 31 rolls along the electrode bar 14 and rocks the latter, causing progressive shifting of its point of contact with the work.

It may be assumed for illustration that the lead screw 36 is housed in the hollow beam 3 and that the threaded lug 35 projects into the beam from beneath. The conductor 13 previously described may be secured to and rigidly held by the beam. A part of the carriage 33 is in sliding contact with the beam, against which it is pressed by the springs 20 and 21 and intermediate parts. That part of the carriage which contacts with the conductor 13 is of good electrically conducting material, as copper, and so are the wheel 31 and the conductive contact between such wheel, its pivot, and the carriage. That is, a good conducting path is maintained between the conductor 13 and the electrode 14 sufficient to carry the powerful welding current without overheating.

Contact between the shiftable electrode 14 and the work is maintained at all times approximately in, and ordinarily somewhat to both sides of, the line radial to the wheel and perpendicular to the bed electrode. As the lead screw, guide, and conductor 13 are all parallel, or substantially so, to the bed electrode, the traverse of the carriage shifts the point of contact or tangency of electrode 14 with the work along the seam line equally with the progress of the carriage along the conductor 13. That is, the electrical welding load shifts approximately equally along both sides of the circuit.

The rocking electrode is free to rock and tilt in the manner occasioned by the pressure of the wheel and the reaction of the work. It is maintained in the desired alinement by guides of any suitable character which, in this instance, are provided by a pair of pins or bars 37, 38, at opposite ends of the carriage, which embrace the electrode. The electrode is also preferably water cooled and is shown as connected at opposite ends with water pipes 39, 40, which are flexible to permit rocking of the electrode, and lead to and from any suitable source and recipient of water or other cooling fluid. But this illustration is simply one of a variety of means which may be employed for cooling the electrode. The bed electrode and its supporting bridge may also be cooled by like or equivalent means.

The use of a rocking electrode interposed between the work and a pressure applying wheel or roller is an important feature of the invention and contributes largely to the result of welding thicker pieces, and more rapidly welding pieces of any practicable thickness, than has been possible heretofore. This is because the electrode bar can be curved to an arc of much longer radius than any wheel electrode which can be used in any commercially practicable welding machine, and also because it is not constrained as to its position by any fixed pivot. A wheel electrode of the relatively small diameters necessitated by the limitations of welding apparatus can have only a short length of contact with the work, and also is held by its axle bearing in such a manner that it cannot exert sufficient pressure upon the seam after the metal has been softened. That is, such wheel electrodes are propelled continuously and are always making new tangent contact with the unsoftened metal of the work as the metal immediately back of the point of tangency becomes soft. The lag in heating effect prevents the metal being equally softened both ahead of and behind the tangent point, so that the wheel is prevented by the hard metal at and ahead of the tangent point from squeezing and compacting the softened metal back of the tangent point. Such lagging is greater with greater speeds of the electrode, and narrowly limits the possible speeds, while causing the metal to be burned when too rapid a speed is attempted.

On the other hand the curved bar electrode has a longer length of contact with the work, due to its large radius, and is free to tilt backward or forward under the pressure of the superposed wheel, and in direct response to the relative hardness or softness of different parts of the metal being welded. If the metal is soft back of the momentary pressure point of the wheel 31, and hard in front of that point, the electrode may rock relatively backward, even during forward progress of the pressure wheel, and its center of curvature may take any position in space dependent on the direction and extent of such rocking. Thus the bar not only remains longer in contact with a given point of the seam, but it also exerts pressure on the softened metal back of the central pressure point of the wheel, as needed to consolidate and perfect the weld. These same conditions also avoid burning of the metal being welded.

Figure 4:
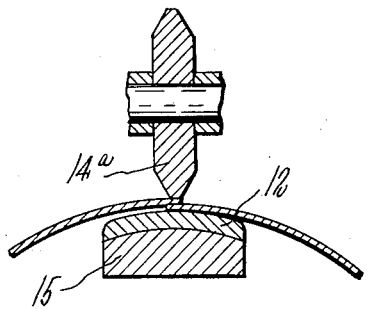
Fig. 4 is a view similar to Fig. 3 showing a wheel electrode of the type heretofore used.
Figure 5:
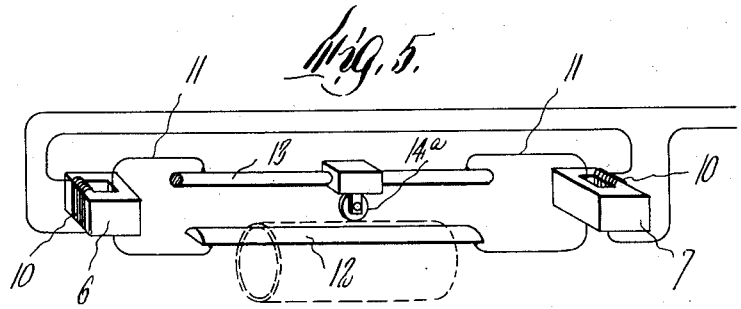
Fig. 5 is a diagram of the electrical circuit including the electrodes, which constitutes one phase of the invention, and in which the primary circuits of the two transformers are in series.
Figure 6:
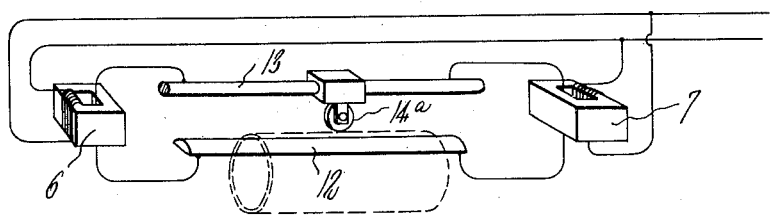
Fig. 6 is a similar view of a modified electrical arrangement in which the transformer primaries are in parallel connection.

It may be noted that while the combination of the two principal features hereinbefore described (i. e., the new electrical circuit and the new type of shiftable electrode) is the preferred embodiment of the invention, and its elements cooperate in obtaining the new and improved results described; nevertheless I do not limit the protection claimed exclusively to this combination, but claim each part as a sub-combination for any use and in any environment to which it may be successfully applicable. For instance, a wheel or roller electrode of the old type may be used in connection with the new circuit, with improved effect as compared with the prior practice of electric seam welding. This fact is illustrated in Fig. 4, where the wheel 14a, mounted and in conducting contact with one side of the electrical circuit in the same manner as the wheel 31, is illustrated also as an electrode making direct contact with the work. The same thing is indicated in the diagrams of Figs. 5 and 6, both for illustration of the foregoing statement and also for simplicity of illustrating the circuit. Also for simplified illustration, and to indicate the nature of variations which may be made in the apparatus within the scope of the invention, these diagrams show one member as combining both functions of a guide for the carriage and a conductor in the welding current circuit. The rocker bar type of shifting electrode may be used also with improved effect as to speed and efficiency of welding and greater thickness of stock capable of being welded, in connection with a single transformer.

The electrical circuits shown in Figs. 5 and 6 are alike in all particulars except one, namely, that in Fig. 5 the primary windings of the transformer are connected in series with a power source, while those of Fig. 6 are connected in parallel with the source of current. In the first case the load current is constant and independent of the position of the load, i. e., the distance of the load from the transformers; while in the second case the load current varies but little with shifting of the position of the load. The departure in either case from the prior practice is a radical one and makes possible a great extension in the length of seam capable of being welded without danger of burning at either end and without the necessity of any variations in the rate of progress of the load point in the course of welding a seam. It is to be understood, however, that any desired means for regulating the speed and reversing the direction of travel of the shiftable electrode may be applied to the propelling mechanism without departure from the invention.

What I claim and desire to secure by Letters Patent is:

1. Electric seam welding apparatus comprising a bed electrode, two proximate sources of welding current in connection with the opposite ends respectively of said electrode, a freely mounted rocker electrode adapted to bear at a point on its convex side against parts to be seam welded which bear in turn on the first electrode, a conductor in connection at its opposite ends with the terminals of the current sources opposite to those which are connected with the first electrode, and a movable conducting and pressure applying means in contact with said conductor and with the concave side of the second electrode adapted to rock the latter while moving lengthwise of the conductor.

2. In an electric seam welding machine, a curved bar electrode adapted to bear at its convex side on the work to be welded, and a roll or wheel bearing on the concave side of said bar electrode and movable lengthwise thereof whereby to rock the electrode and shift its point of load application along the work.

3. In an electric seam welding machine, a curved bar electrode adapted to bear at its convex side on the work to be welded, and a roll or wheel bearing on the concave side of said bar electrode and movable lengthwise thereof whereby to rock the electrode and shift its point of load application along the work, said bar being free to assume an inclination under the pressure of said wheel governed by the condition of softness and hardness of the work.

4. In an electric welding apparatus, a bed electrode, a rocker electrode having a convex side adapted to bear on work which in turn bears on the bed electrode, and a traveling contact and pressure applying wheel bearing on the concave side of said bar and being in connection with one side of a current source, with the other side of which the bed electrode is connected.

5. In an electric seam welding apparatus, the combination with shiftable current supplying means, of an independently movable conductor interposed between said means and the work having tangent contact of limited extent with the work and being free to rock thereon in the manner determined by the progress of the movable conductor, and the conditions as to hardness or softness of adjacent areas of the work.

6. In an electric seam welding machine, the combination with a supporting structure, of an electric circuit for the supply of welding current, and a work support bridge comprising an electrode member in connection at its opposite ends with the electric welding circuit and having a disconnectible portion adapted to be disconnected both mechanically and electrically from the circuit and to be moved aside to permit placement and displacement on the bridge of work pieces having a closed outline.

7. In an electric welding apparatus, a bed electrode, a rocker electrode having a convex side adapted to bear on work which in turn bears on the bed electrode, a guide for said rocker electrode which permits a free rocking movement of the electrode, a traveling contact and pressure applying wheel bearing on the concave side of said rocker electrode and being in connection with one side of a current source, the bed electrode connected to the other side of the current source, and means to progress said pressure applying wheel over said rocker electrode, for the purpose described.

8. In an electric seam welding machine, a pair of spaced electrodes connected with the opposite sides of a source of current supply, one of said electrodes comprising a work support, a curved bar electrode adapted to rest upon the work piece, a pair of guides between which said bar electrode is free to rock, and a movable current conducting and pressure applying means in contact with said curved bar at its concave side for rocking said curved bar as the pressure applying means is progressed longitudinally thereover.

9. In an electric seam welding machine, a curved bar electrode adapted to bear at its convex side on the work to be welded, and means bearing on the concave side of said bar and movable lengthwise thereof to rock the electrode and shift its point of load application along the work.

10. In an electric seam welding machine, a curved bar electrode adapted to bear at its convex side on the work to be welded, and means bearing on the concave side of said curved bar electrode and movable lengthwise thereof to rock the electrode and shift its point of load application along the work, and said curved bar electrode being free to assume an inclination under the pressure of said movable electrode rocking means governed by the condition of softness and hardness of the work.

11. In an electric welding apparatus, a bed electrode, a rocker electrode having a convex side adapted to bear on work which in turn bears on the bed electrode and a traveling contact and pressure applying member bearing on the concave side of said rocker electrode and being in connection with one side of the current source, and the bed electrode being connected to the other side of said current source.

12. In an electric welding machine, a pair of standards arranged in vertical parallel separated relation and each carrying a transformer, a pair of electrodes supported at their ends by said standards and arranged in separated parallel relation and having current conducting connection with said transformers, one of said electrodes serving as a support for the work to be welded, and said work supporting electrode having one of its ends constructed for quick detachable connection with its current supplying transformer and the standard carrying said transformer, for the purpose described.

13. In an electric welding machine, a pair of standards arranged in vertical parallel separated relation and each carrying a transformer, a pair of electrodes supported at their ends by said standards and arranged in separated parallel relation and having current conducting connection with said transformers, one of said electrodes serving as a support for the work to be welded and said work supporting electrode having one of its ends pivotally connected to the standard to permit the opposite end of said electrode to be swung in a horizontal plane for quick detachable connection with its current supplying transformer and the standard carrying said transformer, for the purpose described.

PRESTON M. HALL.